United States Patent [19]

Eltvedt

[11] 4,311,492
[45] Jan. 19, 1982

[54] VACUUM TUBE FILTER COVER

[76] Inventor: Frank Eltvedt, 5 Lake Dr., Lake In The Hills, Ill. 60102

[21] Appl. No.: 189,799

[22] Filed: Sep. 22, 1980

[51] Int. Cl.³ .............................................. B01D 46/54
[52] U.S. Cl. ........................................ 55/158; 55/274; 55/513; 150/52 R; 210/94; 210/406; 220/377; 222/464
[58] Field of Search ............... 220/377, 371, 372, 363; 222/464, 688; 210/459, 463, 474, 406, 94; 264/DIG. 9, DIG. 10; 150/52 R; 55/158, 274, 513

[56] References Cited

U.S. PATENT DOCUMENTS

| 1,898,378 | 2/1933 | McIntyre | 222/464 X |
| 2,154,772 | 4/1939 | Rathemacher | 150/52 X |
| 2,193,356 | 3/1940 | Green | 366/347 |
| 2,486,320 | 10/1949 | Ost | 150/52 R X |
| 2,768,107 | 10/1956 | Magid | 150/52 R |
| 2,821,230 | 1/1958 | May | 150/52 R |
| 3,116,774 | 1/1964 | Callahan | 150/52 R |
| 3,122,990 | 3/1964 | Fried | 220/377 X |

FOREIGN PATENT DOCUMENTS

| 110532 | 5/1944 | Sweden | 210/459 |
| 524294 | 8/1940 | United Kingdom | 220/371 |

Primary Examiner—Frank A. Spear, Jr.
Attorney, Agent, or Firm—Edmond T. Patnaude

[57] ABSTRACT

A soft, flexible cover which is adapted to be attached over the open top of a container has a transparent section for viewing the contents of a container with which the cover is used, a filter section for removing entrained matter from air entering the container, and a tubular section for sealable attachment to a suction tube extending therethrough into the container.

11 Claims, 6 Drawing Figures

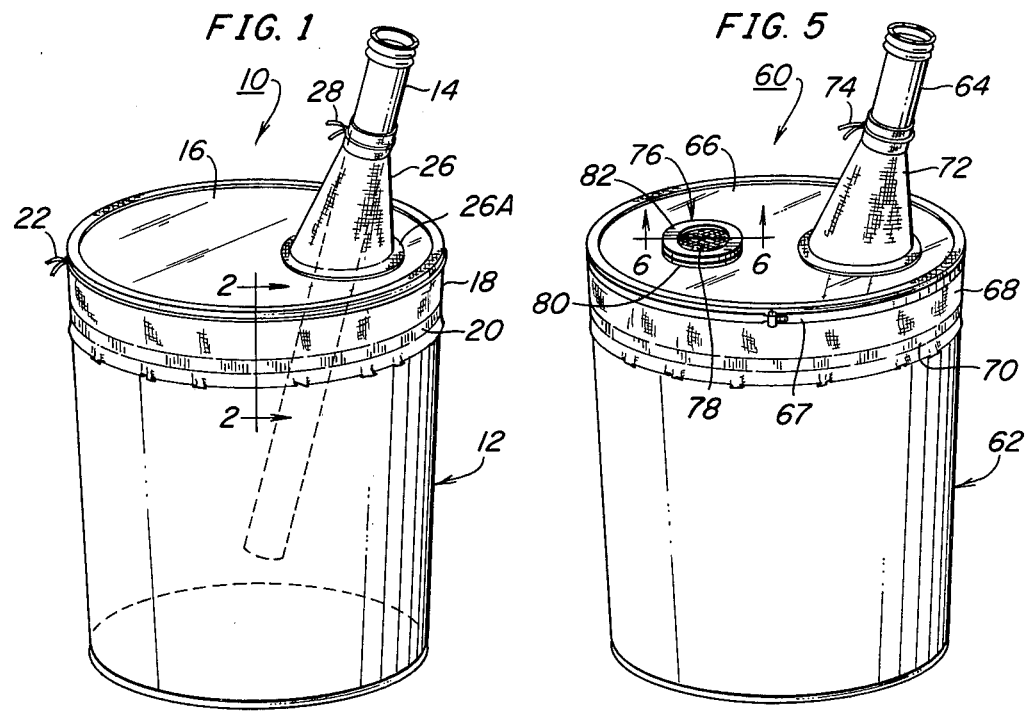
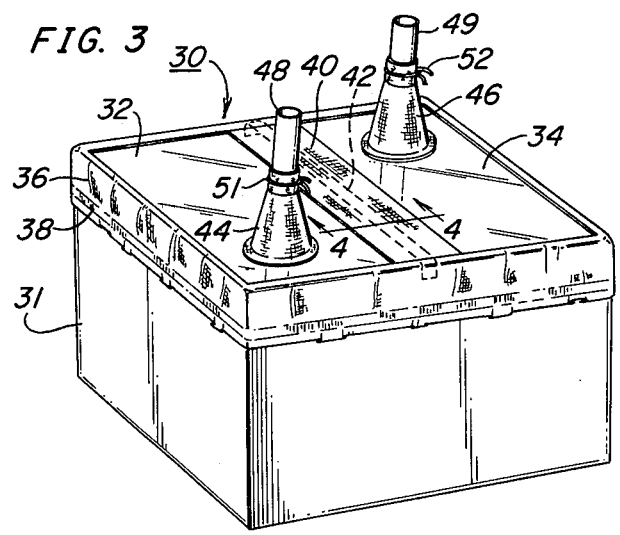
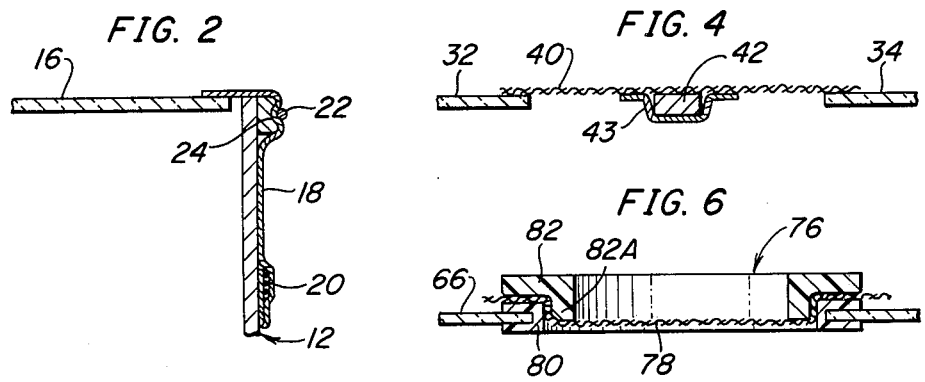

VACUUM TUBE FILTER COVER

The present invention relates in general to the suction transfer of particulate material, such as plastic pellets, from a storage container, and it relates more particularly to a novel filter cover for preventing contamination of the material during the transfer operation.

BACKGROUND OF THE INVENTION

In the plastic molding industry, injection molding presses are commonly charged with plastic particles from an overhead hopper. The raw plastic particles are generally shipped in cylindrical drums or in large boxes of the type referred to in the trade as Gaylords, and the plastic particles are transferred from the shipping containers to the press hoppers by means of vacuum loaders which include a suction tube adapted to extend into the container from which the plastic particles are to be removed.

In accordance with the prior art practice of using such vacuum loaders, the cover is first removed from the shipping container and the suction tube is pushed a short distance down into the mass of plastic pellets. Thereafter as the plastic pellets are removed and the level of the pellets in the container drops, the press operator pushes the suction tube farther down into the mass of plastic particles, and because the level does not ordinarily drop uniformly, the operator must also reposition the tube.

During the transfer operation, the plastic particles are exposed to the ambient and may, therefore, be contaminated. For example, water and oil in the air can adversely affect the subsequent molding operations, and foreign materials may get into the container because of carelessness or for other reasons. Not only is the plastic material expensive, wherefor such contamination is costly, but where, for example, the molded parts are used for packaging pharmaceutical products, such contamination can be hazardous.

SUMMARY OF THE INVENTION

Briefly, in accordance with the present invention there is provided a new and improved filter cover which is adapted to be secured over the open top of a shipping container to prevent contamination of the contents. The cover has an opening which sealably receives a suction tube. Moreover, the cover is formed of a transparent material to permit visual inspection of the contents of the associated container and includes a filter through which ambient air enters the container and which prevents airborne particulates including water and oil particles from entering the container. This Frusto-conical tubular section enables the operator to position the distal end of the suction tube at all locations within a drum-type container. For some applications where two suction tubes are used simultaneously, two of the filter tube sections may be provided in a single cover.

In accordance with another aspect of the invention, an impervious, frusto-conical suction tube connector is provided, and a separate, replaceable filter element is sealably mounted over an opening in the cover. This latter embodiment of the invention finds application where the ambient conditions are extremely dirty or where the molded product must be extremely clean and free from airborne ambient materials wherefor frequent cleaning or replacement of the filter media is necessitated.

GENERAL DESCRIPTION OF THE DRAWINGS

The present invention will be better understood by a reading of the following detailed description taken in connection with the accompanying drawings wherein:

FIG. 1 is a perspective view of a portion of a drum to which a filter cover of the present invention is secured;

FIG. 2 is a cross-sectional view taken along the line 2—2 in FIG. 1;

FIG. 3 is a perspective view of another embodiment of the invention in use with a box-like container and two suction tubes;

FIG. 4 is a cross-sectional view taken along the line 4—4 in FIG. 3;

FIG. 5 is a perspective view of still another embodiment of the invention; and

FIG. 6 is a cross-sectional view taken along the line 6—6 in FIG. 5.

DETAILED DESCRIPTION OF THE INVENTION

Referring to the drawing and particularly to FIGS. 1 and 2 thereof, a filter cover 10 embodying the present invention is positioned over the open top of a container in the form of a drum 12. A pick-up or suction tube 14 extends through the cover 10 into the container 12 for transferring particulate material contained in the container to a remote location to which the tube 14 is connected. The pick-up tube 14 is connected to a vacuum source (not shown) to provide suction within the mass of particulate material contained in the drum 12 for sucking it up into the distal end of the tube. A typical unloader for use with an injection molding press will operate at about seven inches of vacuum.

The cover 10 comprises a generally circular sheet of transparent plastic film 16, which is flexible, and a band 18 of a tightly woven filter cloth which is sewn along its upper edge to the sheet 16 to provide a substantially tight sealed connection between the sheet 16 and the band 18. An elastic strip 20 is attached to the bottom edge of the band 18, and a drawstring 22 extends through a tubular portion of the band 18 just below the transparent sheet 16. As best shown in FIG. 2, the drawstring 22 is used to press a continuous annular area of the band 18 tightly into an annular groove 14 which surrounds the drum 12 near the top thereof. Ordinarily this groove is used to secure a rigid cover to the drum during shipment and storage thereof. The use of the tie string or cord 22 permits a tightly sealed connection to a drum which may have been damaged and is somewhat oval or irregular in shape. Although a hermetically tight seal may not in some cases be provided between the band 18 and the surface of the groove 24, the elastic band 20 at the bottom of the cover prevents airborne particulates from entering the container. The drawstring, does however, prevent spurious removal of the cover which might otherwise be possible if only the elastic band 20 were used.

A frusto-conical tubular member 26 formed of a good grade of filter cloth, such as sateen, which will not pass airborne liquid particles such as water and oil, has its large lower end 26A sewn or otherwise attached to the sheet 16 over a circular opening therein and its smaller upper end is provided with a drawstring 28 for tightly and sealably connecting the upper end of the member 26 to the pick-up tube 14.

During the transfer of material from the drum 12 a vacuum is drawn in the drum and ambient air is thus sucked into the drum through the tubular section 26. The fact that the sheet 16 is transparent and the entire cover is flexible and pliable permits the operator to observe and thus properly position the lower end of the pick up tube within the material in the drum 12 so as to affect complete removal thereof.

FIG. 3 shows another embodiment of the invention for use with a container which is rectangular in horizontal cross-section and which is generally larger than a drum. This type of container may be used to supply plastic particles simultaneously to a number of injection molding presses. As there shown, a cover embodying the present invention includes a pair of rectangular, plastic sheet sections 32 and 34 which are secured as by sewing to a continuous band 36 of filter cloth. An elastic band 38 is provided along the lower edge of the band 36 and a strip 40 of filter cloth is sewn at its ends to the band 36 and along its sides to the respective transparent sheets 32 and 34. A rigid brace member 42 extends along the longitudinal central axis of the strip 40 and is attached to the strip 40 by means of a narrow strip of fabric 43 which, as best shown in FIGS. 3 and 4, is sewn along its side edges to the strip 40. The brace 42 is sufficiently long so as to rest on the top of the opposite side walls of the container 31 and thus prevent the central part of the cover 30 from sagging therein.

A frusto-conical tubular section 44 is sewn or otherwise attached along it large diameter bottom edge over an opening in the sheet 32 and a frusto-conical tubular section 46 is sewn in like manner to the sheet 34.

A pair of pick-up tubes 48 and 49 respectively extend through the sections 44 and 46 into the material within the container 31. The tubular sections 44 and 46 are tightly held in sealing relationship to the respective pick-up tubes 48 and 49 by means of drawstrings 51 and 52 respectively.

If desired, the cover 30 may also include a drawstring in the band portion 36 for holding the band tightly against the sides of the container 34 to prevent spurious removal of the cover from the container and to effect a better seal between the band 36 and the sides of the container.

Referring to FIG. 5, a flexible, transparent cover 60 constituting another embodiment of the invention is shown mounted over the upper open end of a drum 62 containing a particulate material to be transferred to another location by means of a suction tube 64 which extends through the cover 60 into the mass of particulate material (not shown) within the drum 62. The cover 60 includes a generally circular, transparent, flexible and pliable sheet 66 which is sewn along its edges to an annular band of cloth or the like 68 which has an elastic band sewn into the lower or distal edge portion thereof. A frusto-conical tubular section 72 is sewn to the sheet 66 over an opening therein and is sealably secured to the tube 64 by means of a drawstring 74.

In the embodiment of the invention shown in FIG. 5 the cover 60 is sealably secured to the drum 62 by means of a clamp-ring 67 which may be formed of metal or plastic. This ring 67 is preferably the same ring which was used to hold the initial cover on the drum. When used with the cover 60 it functions to press the band 68 tightly into the annular groove at the rim of the drum 62.

Mounted over an opening in the sheet 66 is a filter means 76 which, as best shown in FIG. 6, includes a circular sheet of filter paper or the like 78 which is removably mounted to the cover 60 for replacement thereof when necessary. Considered in greater detail, a plastic, annular grommet 80 is bonded to the sheet 66 around a circular opening in the sheet in any suitable manner such as by heat sealing. A circular filter holder 82 has a depending annular flange 82A which tightly fits into the inner diameter of the grommet 80 to press the filter media 78 tightly therein. When the filter media 78 becomes dirty or damaged and requires replacement, the ring 82 is pried upwardly out of the grommet 80 to release the filter sheet 78 for ready replacement thereof. In this embodiment of the invention the frusto-conical tubular section 72 through which the pick-up tube extends is preferably formed of an impervious material so that all of the air entering the container during the transfer operation must pass through the replaceable filter media 78.

The present invention thus provides a filter cover for use with a pick-up or suction tube or the like for use in the vacuum transfer of particulate material from a drum or other container such as the well known Gaylord. The cover of the present invention can be tightly fitted to various sizes of containers and also to containers which have been damaged to prevent contamination of the contents of the container while permitting the operator to view the contents and to permit the operator to optimize the positioning of one or more pick-up tubes within the container. In the illustrated embodiments of the invention drawstrings are used to secure the covers to the containers and to seal the covers to the pick-up tubes. However, for some applications it might be preferable to provide other means such as Velcro fasteners or snap fasteners to effect these connections to the containers and to the pick-up tubes.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A filter cover for use with an open top container into which two suction tubes extend for removing particulate material therefrom, comprising
   first and second transparent, flexible sheets each having an opening therethrough
   first and second generally tubular sections each formed of a flexible material and respectively positioned over said openings,
   the lower ends of said frustoconical sections being sealably secured to said flexible sheets around said openings,
   means for sealably connecting the upper ends of said frustoconical sections to the exteriors of said suction tubes when said tubes extend into said container,
   means for sealably securing said cover to said container over said open top thereof, and
   a strip of flexible filter material which is impervious to water and oil interconnecting said transparent flexible sheets.

2. A filter cover according to claim 1 wherein said tubular sections are formed of said filter material.

3. A filter cover according to claim 2 wherein said tubular sections are frusto-conical.

4. A filter cover for use with an open top container into which a suction tube extends for removing particulate material therefrom, comprising a transparent, flexible sheet, means for sealably securing said sheet to said container over said open top thereof, an opening in said sheet through which said suction tube is adapted to extend into said container, means for sealing said tube to said sheet around said opening, filter means incorporated in said cover for removing liquid and other entrained particles from the ambient air passing through said filter means into said container, said filter means comprising a flexible sheet of filter material, and means for removably securing said sheet of filter material to said cover.

5. A filter cover for use with an open top container into which a suction tube extends for removing particulate material therefrom, comprising a planar, transparent, flexible sheet, means for sealably securing said sheet to said container over said open top thereof, an opening in said sheet through which said suction tube is adapted to extend into said container, means for sealing said tube to said sheet around said opening, and filter means incorporated in said cover for removing liquid and other entrained particles from the ambient air passing through said filter means into said container, said filter means comprising a tubular section of filter cloth sealably fastened at one end to said sheet over said opening and adapted to be sealably fastened at the other end to said suction tube.

6. A filter covering according to claim 5 wherein said tubular section is frusto-conical.

7. A filter cover for use with an open top container into which a suction tube extends for removing particulate material therefrom, comprising a planar, transparent, flexible sheet, means for sealably securing said sheet to said container over said open top thereof, an opening in said sheet through which said suction tube is adapted to extend into said container, means for sealing said tube to said sheet around said opening, and filter means incorporated in said cover for removing liquid and other entrained particles from the ambient air passing through said filter means into said container, said filter means comprising a band of filter cloth sealably fastened to the periphery of said sheet to provide a skirt which is adapted to depend along the side of said container.

8. A filter cover according to claim 7 comprising drawstring means secured to said band for encircling said container to secure said cover thereto.

9. A filter cover according to claim 8 comprising an elastic strip secured to said band for resiliently engaging said container, said drawstring means being disposed between said elastic strip and said sheet.

10. A filter cover for use with an open top container into which a suction tube extends for removing particulate material therefrom, comprising a transparent, flexible sheet, means for sealably securing said sheet to said container over said open top thereof, an opening in said sheet through which said suction tube is adapted to extend into said container, means for sealing said tube to said sheet around said opening, filter means incorporated in said cover for removing liquid and other entrained particles from the ambient air passing through said filter means into said container, a second opening in said sheet, means for sealing a second suction tube to said sheet around said second opening, and a brace extending across said cover between said openings.

11. A filter cover according to claim 10 wherein said means for sealing said tube to said sheet comprises drawstring means.

* * * * *